(12) United States Patent
Hu et al.

(10) Patent No.: US 11,579,858 B2
(45) Date of Patent: Feb. 14, 2023

(54) METHOD, DEVICE, AND STORAGE MEDIUM FOR PROCESSING DRIVER ON TERMINAL DEVICE SIDE

(71) Applicant: Zhuhai Pantum Electronics Co., Ltd., Zhuhai (CN)

(72) Inventors: Dongcheng Hu, Zhuhai (CN); Jingling Chen, Zhuhai (CN); Han Yu, Zhuhai (CN); Jibing Peng, Zhuhai (CN); Xiang Chen, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 16/511,270

(22) Filed: Jul. 15, 2019

(65) Prior Publication Data
US 2020/0026504 A1 Jan. 23, 2020

(30) Foreign Application Priority Data
Jul. 18, 2018 (CN) .......................... 201810790142.0

(51) Int. Cl.
  *G06F 8/61* (2018.01)
  *G06F 13/10* (2006.01)
  *G06F 3/0482* (2013.01)

(52) U.S. Cl.
  CPC ............. *G06F 8/61* (2013.01); *G06F 3/0482* (2013.01); *G06F 13/102* (2013.01)

(58) Field of Classification Search
  CPC .................................. G06F 8/61; G06F 13/102
  USPC ........................................................ 717/175
  See application file for complete search history.

(56) References Cited

U.S. PATENT DOCUMENTS

| | | | | |
|---|---|---|---|---|
| 10,838,738 | B2* | 11/2020 | Hu | G06F 3/1236 |
| 2002/0059310 | A1* | 5/2002 | Choi | G06F 11/0748 |
| 2003/0227641 | A1* | 12/2003 | Edmonds | G06F 3/1285 |
| | | | | 358/1.13 |
| 2005/0066072 | A1* | 3/2005 | Nakamura | G06F 3/1204 |
| | | | | 710/8 |
| 2005/0210464 | A1* | 9/2005 | Machida | G06F 9/4411 |
| | | | | 717/174 |
| 2010/0079782 | A1* | 4/2010 | Tsuya | G06F 9/4411 |
| | | | | 358/1.13 |
| 2014/0081876 | A1* | 3/2014 | Schulz | G06Q 10/20 |
| | | | | 705/305 |
| 2015/0140986 | A1* | 5/2015 | Lamb | H04L 12/2898 |
| | | | | 455/418 |
| 2016/0142581 | A1* | 5/2016 | Morita | H04W 4/80 |
| | | | | 358/1.13 |
| 2017/0031668 | A1* | 2/2017 | Kikuchi | G06F 9/4411 |

(Continued)

OTHER PUBLICATIONS

The European Patent Office (EPO) the Extended European Search Report for 19186206.9 dated Jan. 23, 2020 9 Pages.

*Primary Examiner* — Lewis A Bullock, Jr.
*Assistant Examiner* — Theodore E Hebert
(74) *Attorney, Agent, or Firm* — Anova Law Group, PLLC

(57) ABSTRACT

Method, device, and storage medium for processing a driver on a terminal device side are provided. A method includes obtaining connection information between a peripheral device corresponding to the driver and a terminal device; determining, according to the connection information, driver installation options capable of successfully installing the driver; and displaying the driver installation options capable of successfully installing the driver.

18 Claims, 5 Drawing Sheets

(56) References Cited

U.S. PATENT DOCUMENTS

2020/0026504 A1\* 1/2020 Hu .................. G06F 9/4411
2020/0026526 A1\* 1/2020 Hu .................. G06F 3/1204

\* cited by examiner

METHOD, DEVICE, AND STORAGE MEDIUM FOR PROCESSING DRIVER ON TERMINAL DEVICE SIDE

CROSS-REFERENCE TO RELATED APPLICATION

This application claims priority to a Chinese patent application No. CN201810790142.0, filed on Jul. 18, 2018, the entire content of which is incorporated herein by reference.

TECHNICAL FIELD

The present disclosure relates to the field of electronic device technology and, more particularly, to a method, an apparatus, and a device for processing a driver on a terminal device side.

BACKGROUND

A peripheral device needs to be connected to a terminal, and the terminal can be a computer. A peripheral device needs to receive job data released by the terminal before starting to complete an image forming process, for example, before performing a printing operation. Opening and editing of documents in the terminal are usually completed by some document operation application programs. The document operation application programs can be applications including, for example, Word, WPS, PhotoShop, Adobe, etc. How to have the documents opened by the application programs in the terminal directly sent to the peripheral device requires the installation of a driver in the peripheral device.

In existing technologies, the terminal device can display all installation modes supported by a current driver installation package. For example, the terminal device displays that the current driver installation package supports a wireless connection and a universal serial bus (abbreviated as "USB") connection. Then, the user selects a connection mode and further complete a connection between the terminal device and the peripheral device.

However, in existing technologies, the terminal device only displays the installation modes supported by the current driver installation package, but the installation modes supported by the driver installation package are not installation modes actually supported. Thus the driver installation failure may occur. In addition, the display mode provided in existing technologies may also mislead the user. For example, some peripheral device hardware does not support a wired network function or a wireless network function, but the display interface corresponding to the current driver installation package still displays network installation options. This may cause the users to mistakenly think that their peripheral device supports a network function. When a driver installation is performed under a network installation option, the users may complain the device provider instead, causing unnecessary disputes between the users and the peripheral device provider.

SUMMARY

One aspect of the present disclosure provides a method for processing a driver on a terminal device side. The method includes:

obtaining connection information between a peripheral device corresponding to the driver and a terminal device;

determining, according to the connection information, driver installation options capable of successfully installing the driver; and displaying the driver installation options capable of successfully installing the driver.

Another aspect of the present disclosure provides an apparatus for processing a driver on a terminal device side. The apparatus includes:

an obtaining module configured to obtain connection information between the peripheral device corresponding to the driver and the terminal device;

a determining module configured to determine, according to the connection information, driver installation options capable of successfully installing the driver; and a display module configured to display the driver installation options capable of successfully installing the driver.

Another aspect of the present disclosure provides a terminal device. The terminal device includes a memory, configured to store program instructions for performing a method for processing a driver; and a processor, coupled to the memory, and when the program instructions being executed, configured to:

obtain connection information between a peripheral device corresponding to the driver and the terminal device;

determine, according to the connection information, driver installation options capable of successfully installing the driver; and display the driver installation options capable of successfully installing the driver.

Another aspect of the present disclosure provides a non-transitory computer-readable storage medium, containing program instructions for, when executed by a processor, performing a method for processing a driver on a terminal device side, the method including:

obtaining connection information between a peripheral device corresponding to the driver and a terminal device;

determining, according to the connection information, driver installation options capable of successfully installing the driver; and displaying the driver installation options capable of successfully installing the driver.

Another aspect of the present disclosure provides a peripheral device, connected to the terminal device. After the terminal device completes an installation of the driver according to the disclosed methods, the peripheral device communicates with the terminal device.

Other aspects or embodiments of the present disclosure can be understood by those skilled in the art in light of the description, the claims, and the drawings of the present disclosure

BRIEF DESCRIPTION OF THE DRAWINGS

In order to more clearly illustrate the technical solutions of the embodiments of the present disclosure, the drawings used for illustrating the embodiments will be briefly described below. It should be understood that the following drawings merely illustrate some embodiments of the present invention. For those of ordinary skill in the art, other drawings can be obtained according to these drawings without any creative work.

DETAILED DESCRIPTION OF THE EMBODIMENTS

Figure 1:
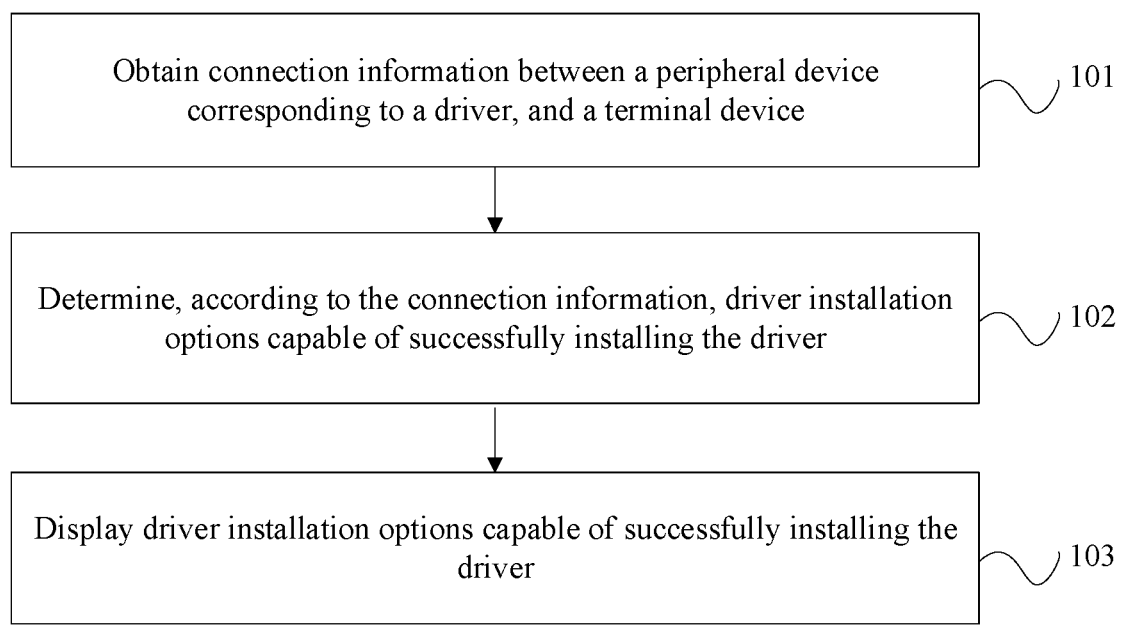
FIG. 1 is a schematic flowchart of a method for processing a driver on a terminal device side according to disclosed embodiments of the present disclosure.

For a better understanding of the technical solutions of the present disclosure, the embodiments of the present disclosure are described in detail below with reference to the accompanying drawings.

It should be understood that the described embodiments are some but not all of the embodiments of the present invention. Based on the disclosed embodiments, persons of ordinary skill in the art may derive other embodiments without creative work, all of which are within the scope of the present disclosure.

The terms used in the embodiments of the present disclosure are merely for the purposes of describing particular embodiments, and are not intended to limit the disclosure. As used herein and in the appended claims, the singular forms "a," "an," and "the" include the plural reference unless the context clearly dictates otherwise.

It should be understood that the term "and/or" as used herein is merely an association relationship for describing the associated objects, indicating that there may be three relationships, for example, A and/or B, which may indicate that A exists alone, that both A and B exist, or that B exists alone. In addition, the character "/" in this disclosure generally indicates that the associated objects have an "or" relationship.

Depending on the context, the word "if" as used herein may be interpreted as "while" or "when" or "in response to determining" or "in response to detecting." Similarly, depending on the context, the phrase "if it is determined that" or "if it is detected that (conditions or events stated)" may be interpreted as "when it is determined that" or "in response to determining that" or "when it is detected that (conditions or events stated)" or "in response to detecting that (conditions or events stated)".

A method, an apparatus, a device, and storage medium for processing a driver on a terminal device side are provided to solve issues that installation modes supported by a driver installation package are not installation modes that are actually supported, and thus driver installation fails.

In one embodiment, connection information between a peripheral device corresponding to the driver and the terminal device is obtained; according to the connection information, driver installation options capable of successfully installing the driver are determined; and the driver installation options capable of successfully installing the driver are displayed. Therefore, the terminal device can obtain installation modes between the terminal device and the peripheral device supported by the terminal device, and can install the driver in an installation mode supported by the terminal device, thereby preventing a situation in which the connection between the peripheral device and the terminal device is incorrect. The peripheral device and the terminal device can be connected correctly to ensure that the driver is successfully installed. By displaying to a user driver installation options capable of successfully installing the driver, the user can directly know the network functions supported by the peripheral device, and unnecessary disputes between the user and the provider for the peripheral device can be prevented from occurring.

Exemplary Embodiment 1

A method for processing a driver on a terminal device side is provided according to disclosed embodiments of the present disclosure. FIG. 1 is a schematic flowchart of a method for processing a driver on a terminal device side according to disclosed embodiments of the present disclosure. As shown in FIG. 1, the method includes the following exemplary steps.

At Step 101, connection information between a peripheral device corresponding to the driver or drive program and the terminal device is obtained.

For example, the executing entity in the embodiment is a terminal device, and the terminal device may be a device such as a computer, etc. In this embodiment, the driver is first stored in the terminal device in the form of an installation package. After the driver is successfully installed, it can be used to convert the job data provided by application programs into data and instructions that the peripheral device can recognize. The driver installation package according to the embodiment generally corresponds to multiple models of peripheral devices developed by a certain manufacturer. For example, model name of P3500 indicates a device that only supports a USB port. Model name of P3500N indicates a device that supports a USB port and a wired network port. Model name of P3500NW indicates a device that supports a USB port, a wired network port, and a wireless network port. In an implementation manner provided by this embodiment, it is assumed that the terminal device supports at same time a USB port, a wired network port, a wireless network port, and the like, and all ports supported by peripheral devices of the models corresponding to the driver. After clicking the driver installation package in the terminal device, the driver installation interface is entered, and the driver detects whether each individual port of the current terminal device has a peripheral device connected thereto. When a connected peripheral device is obtained, model information of the peripheral device can be further obtained to determine whether the peripheral device is a peripheral device supported by the current driver and which driver installation mode the peripheral device supports. Of course, this embodiment is not limited to the above assumptions. When the terminal device cannot at same time support all the above-described ports or when some ports (for example, the wired network port and the wireless network port) are not connected according to specified requirements, preferred implementation manners described below can be followed. It is displayed that the terminal device ports do not support the corresponding operation. When a port of the terminal device supports the corresponding operation, and if the peripheral device is still not obtained, it is displayed that the peripheral device is not connected to the corresponding port. Thus, the user can know in time that the port connection of the terminal device does not satisfy requirements or that the peripheral device is not connect as required or does not support the driver installation option for the corresponding port.

The terminal device can detect which driver the peripheral device corresponds to; then the terminal device detects the connection information between the peripheral device and the terminal device. For example, the connection information can be obtained by detecting interface information between the terminal device and the peripheral device; or the connection information can be a connection status between the terminal device and the peripheral device.

The peripheral device can be an image forming apparatus. From the principle of image formation, the image forming device may be, but not limited to, a laser printer, an inkjet printer, or a light-emitting diode (LED) printer. In terms of functions, an image forming device may be, but not limited to, a single function printer, a copy machine, and a multifunction printer, where the multifunction can include at least one of functions that include scanning, faxing, binding, and the like.

In preferred implementation manners of the embodiment, obtaining the connection information between the peripheral device corresponding to the driver and the terminal device further includes: when a network connection established between the peripheral device corresponding to the driver and the terminal device is obtained, obtaining whether the network attribute information corresponding to the peripheral device satisfies a predetermined requirement, and determining whether the network connection between the peripheral device and the terminal device belongs to a wired network connection or a wireless network connection. For example, on the terminal device loaded with the above-described driver installation package, after "start" of the driver installation package in clicked, the driver calls the interface resource in the terminal device, and obtains an IP address of the peripheral device through the network protocol. Further, if a wired network card is installed in the peripheral device, the corresponding address range of the wired network card is known. Thus, in the driver installation package, it can be configured in advance to detect whether the network address corresponding to the peripheral device is in the known address range. If so, it is determined that the network connection between the peripheral device and the terminal device belongs to a wired network connection, otherwise the network connection belongs to a wireless network connection. Further, when a network connection established between the peripheral device corresponding to the driver and the terminal device is obtained, and when one network address is obtained, it is only determined whether the connection channel corresponding to the one network address belongs to a wired network connection or a wireless network connection. If there are more than two network addresses, it is also separately determined whether the network channel corresponding to each network address belongs to a wired network connection or a wireless network connection. When all the network channels belong to wired network connections, determining the driver installation option described below can only determine driver installation options that support connections that can successfully follow the wired network. When all the network channels belong to wireless network connections, determining the driver installation option described below can only determine driver installation options that support connections that can successfully follow the wireless network. If some of the network channels belong to the wired network connection, and some other of the network channels belong to the wireless network connection, determining the driver installation option described below determines driver installation options that support connections that can successfully follow the wired network and driver installation options that support connections that can successfully follow the wireless network.

At Step 102, according to the connection information, driver installation options capable of successfully installing the driver are determined.

For example, the terminal device in Step 101 can obtain whether at least one port of the terminal device has a peripheral device connected thereto, and at a status that a peripheral device is connected, can also obtain which connection mode the peripheral device supports. In a preferred implementation manner, the terminal device determines, according to the obtained connection information, a connection mode between the terminal device and the peripheral device, e.g., a connection mode between the terminal device and the peripheral device supportable by the terminal device, or an allowed connection mode between the terminal device and the peripheral device. The connection mode can be a USB connection mode, a wired network connection mode, a wireless network connection mode, etc. The wireless connection mode can include a wireless broadband (Wireless-Fidelity, abbreviated as "Wi-Fi") network connection mode, a Bluetooth connection mode, etc. Further, driver installation options by which the terminal device can successfully install the driver and driver installation options by which the terminal device cannot successfully install the driver are determined.

At Step 103, driver installation options capable of successfully installing the driver are displayed.

Step 103 includes the following implementation methods.

In an exemplary implementation method of Step 103, driving installation options corresponding to the connection mode allowed between the terminal device and the peripheral device are displayed at a first status; and driving installation options corresponding to the connection mode unallowed between the terminal device and the peripheral device are displayed at a second status, where the first status characterizes a driver installation option that allows a user to select, and the second status characterizes a driver installation option that does not allow a user to select.

In another exemplary implementation method of Step 103, only the driver installation options capable of successfully installing the driver are displayed, and driver installation options uncapable of successfully installing the driver is not displayed.

Being capable of successfully installing the driver indicates that the terminal device and peripheral device include hardware required by a driver installation option in the driver that satisfies a predetermined requirement, and the terminal device and the peripheral device are connected according to a predetermined requirement, such that the prerequisite for the successful installation of the driver installation option is already available. Being uncapable of successfully installing the driver indicates that the terminal device and the peripheral device include hardware required by the driver installation option in the driver that does not satisfy a predetermined requirement, and/or the terminal device and the peripheral device are not connected according to a predetermined requirement, such that the prerequisite for the successful installation of the driver installation option is unavailable.

For example, the terminal device can display driver installation options by which the current terminal device can successfully install the driver at a first status. Meanwhile, the driver installation options are driver installation options corresponding to allowed connection modes between the terminal device and the peripheral device. For these driver installation options, the user can make a selection. Further the terminal device displays the driver installation options by which the current terminal device cannot successfully install the driver at a second status. Meanwhile, the driver installation options are driver installation options corresponding to the connection modes unallowed between the terminal device and the peripheral device. For these driver installation options, the user cannot make a selection. Thus, the terminal device displays the allowed connection modes between the terminal device and the peripheral device, and the connection modes that are unallowed between the terminal device and the peripheral device.

Or else, the terminal device displays only driver installation options by which the current terminal device could successfully install the driver. Meanwhile, the driver installation options are driver installation options corresponding to allowed connection modes between the terminal device and the peripheral device. For these driver installation options, the user is allowed to make a selection.

Further, the terminal device can provide a driver installation interface, and the terminal device displays the driver installation options on the driver installation interface.

Figure 2:
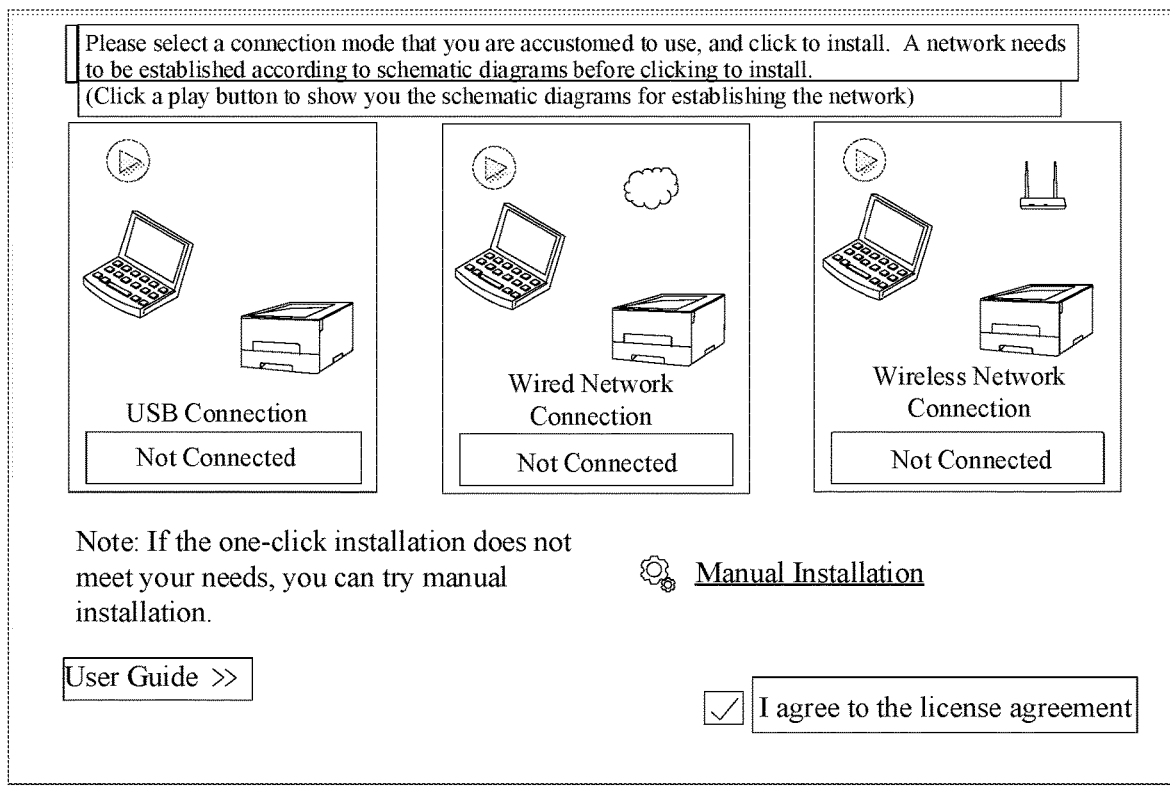
FIG. 2 is a display diagram of driver installation options according to disclosed embodiments of the present disclosure.

For example, FIG. 2 is a display diagram of driver installation options provided by various embodiments of the present disclosure. As shown in FIG. 2, the terminal device displays the driver installation options graphically, and the user can know that the terminal device supports making a USB connection, making a wired network connection, and making a wireless network connection with the peripheral device. Or else, the terminal device displays connection modes between the terminal device and the peripheral device supported by the terminal device, and connection modes between the terminal device and the peripheral device that are not supported by the terminal device. The terminal device can mark the displayed icons with different colors. For example, the terminal device displays, in a gray mode, connection modes between the terminal device and the peripheral device that are not supported by the terminal device and/or connection modes for which the current terminal device and the peripheral device are not connected according to a predetermined requirement. When a connection mode is displayed in gray, after the user clicks, the installation operation is not performed. The terminal device displays, in a highlighted mode, connection modes between the terminal device and the peripheral device that are supported by the terminal device and/or connection modes for which the current terminal device and the peripheral device are connected according to a predetermined requirement, and after the user clicks, the installation operation is directly performed.

For example, when the terminal device determines that a USB connection is usable, the corresponding driver installation option can be displayed and clicked, and when neither the wired network connection nor the wireless network connection is usable, "not connected" is displayed for the corresponding driver installation options.

For example, the terminal device may not display the driver installation option that currently cannot be successfully installed, e.g., an option that an image forming apparatus hardware does not support or an option supported by an image forming apparatus hardware but for which an actual connection is not made.

For example, the terminal device can also display options for the user to select a model, and the driver determines which types of driver installation options are supported by the image forming apparatus model selected by the current user, and then the terminal device displays only the installation options that are supported by the hardware of the image forming apparatus of the current model. Then, according to the connection status between the terminal device and the image forming apparatus, "click to install" exists for an installation option for which the port is connected, and "unconnected" is displayed for an installation option for which the port is not connected.

For example, P3500NW supports a USB, a wired network, and a wireless network. Therefore, according to the display mode in FIG. 2, three installation options need to be displayed. P3500N only supports a USB and a wired network, then only the USB and wired network are displayed. P3500W only supports a USB and a wireless network, then only the USB and the wireless network are displayed.

It should be noted that, as shown in FIG. 2, in the implementation method according to the embodiment, after the driver installation package file is clicked, the license agreement is selected by default and installation is performed according to the above-described implementation method. However, the embodiment is not limited thereto, and the license agreement may be unchecked by default, and "determining driver installation options capable of successfully installing the driver" or "displaying driver installation options capable of successfully installing the driver" mentioned in the above-described implementation methods is allowed to be performed after the user selects the license agreement. In this embodiment, the connection information between the peripheral device corresponding to the driver and the terminal device is obtained; according to the connection information, the driver installation options capable of successfully installing the driver are determined; and the driver installation options capable of successfully installing the driver are displayed. Therefore, the terminal device can obtain installation modes between the terminal device and the peripheral device supported by the terminal device, and can install the driver in an installation mode supported by the terminal device, thereby preventing a situation in which the connection between the peripheral device and the terminal device is incorrect. Thus, the peripheral device and the terminal device can be connected correctly, and successful installation of the driver is ensured. By displaying, to the user, the driver installation options capable of successfully installing the driver, the user can directly know the network functions supported by the peripheral device, and unnecessary disputes between the user and the provider for the peripheral device may be prevent from occurring.

Exemplary Embodiment 2

Figure 3:
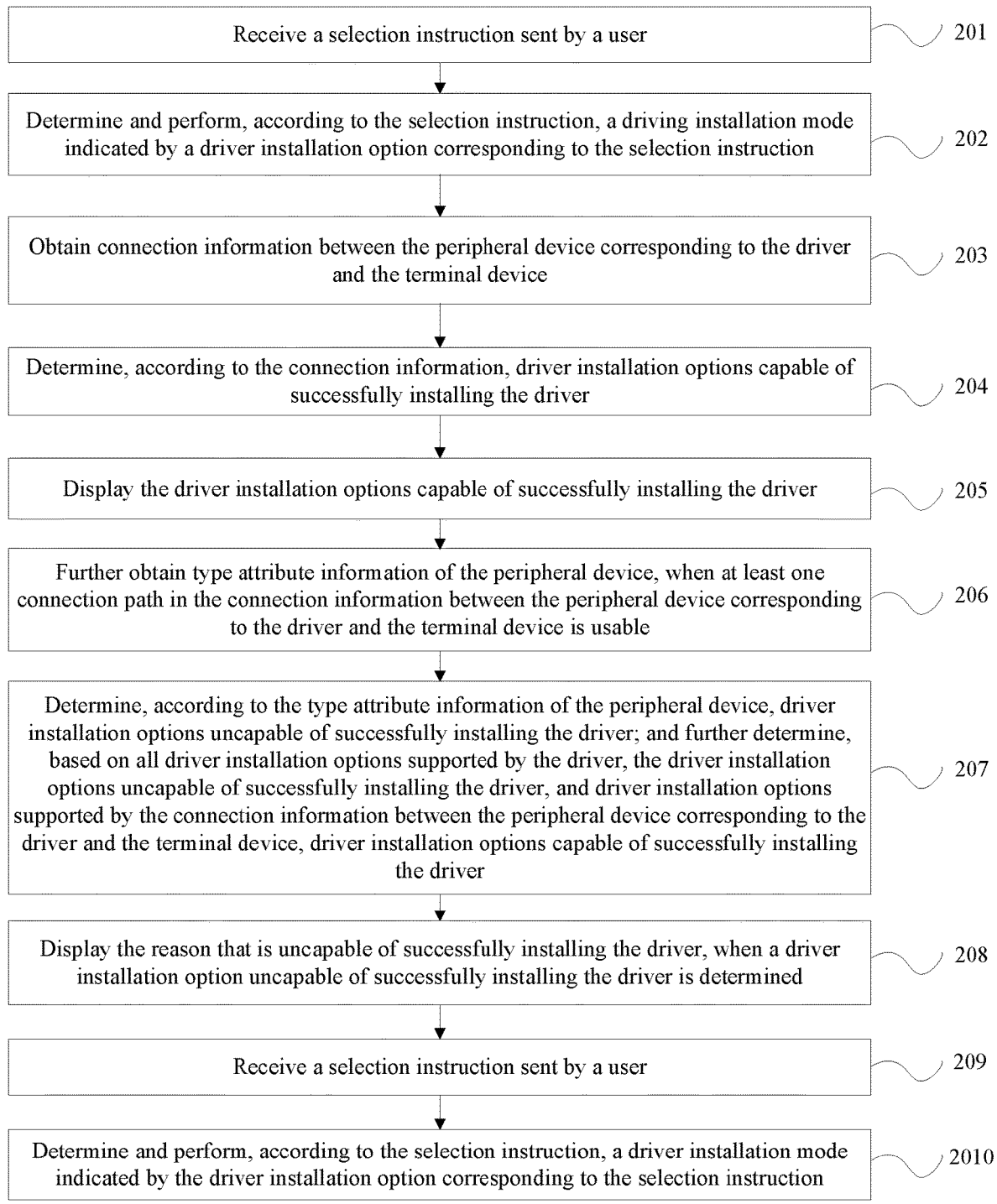
FIG. 3 is a schematic flowchart of another method for processing a driver on a terminal device side according to disclosed embodiments of the present disclosure.

Embodiments of the present disclosure provides another method for processing a driver on a terminal device side. FIG. 3 is a schematic flowchart of another method for processing a driver on a terminal device side according to disclosed embodiments of the present disclosure. As shown in FIG. 3, the method includes the following exemplary steps.

At Step 201, a selection instruction sent by a user is received.

For example, the user selects the installation package of the driver displayed by the terminal device. For example, the user can select the installation package of the driver by clicking, and the terminal device receives the selection instruction sent by the user, and the selection instruction indicates the installation package for the driver selected by the user.

At Step 202, according to the selection instruction, a driving installation mode indicated by a driver installation option corresponding to the selection instruction is determined and performed.

For example, after receiving the selection instruction, the terminal device determines a driver installation option corresponding to the selection instruction, and then the terminal device determines and performs the driver installation mode indicated by the driver installation option.

At Step 203, connection information between the peripheral device corresponding to the driver and the terminal device is obtained, for example, as similarly described in Step 101 of FIG. 1.

At Step 204, according to the connection information, driver installation options capable of successfully installing the driver are determined, for example, as similarly described in Step 102 of FIG. 1.

At Step 205, the driver installation options capable of successfully installing the driver are displayed, for example, as similarly described in Step 103 of FIG. 1.

At Step 206, when at least one connection path in the connection information between the peripheral device corresponding to the driver and the terminal device is usable, type attribute information of the peripheral device is further obtained.

For example, the terminal device detects whether a connection path in the connection information between the peripheral device corresponding to the driver and the terminal device is usable, and when it is determined that at least one connection path in the connection information is usable, the terminal device can obtain type attribute information of the peripheral device. The type attribute information of the peripheral device can be the model of the peripheral device, the type of the peripheral device, etc.

At Step 207, according to the type attribute information of the peripheral device, driver installation options uncapable of successfully installing the driver are determined; and further, based on all driver installation options supported by the driver and the driver installation options uncapable of successfully installing the driver, and driver installation options supported by the connection information between the peripheral device corresponding to the driver and the terminal device, driver installation options capable of successfully installing the driver are determined.

For example, the terminal device determines, according to the type attribute information of the peripheral device, driver installation options that cannot successfully install the driver, and all driver installation options supported by the driver. Then, based on all driver installation options supported by the driver, the driver installation options that cannot successfully install the driver, and driver installation options supported by the connection information between the peripheral device corresponding to the driver and the terminal device, the terminal device determines driver installation options capable of successfully installing the driver and driver installation options that cannot successfully install the driver.

At Step 208, when a driver installation option uncapable of successfully installing the driver is determined, the reason that is uncapable of successfully installing the driver is displayed.

For example, when the terminal device determines at Step 207 the driver installation option that cannot successfully install the driver, the terminal device can also obtain the reason why the driver cannot be successfully installed. Then the terminal device can display the reason why the driver cannot be successfully installed by means of text, voice, image, and the like.

At Step 209, a selection instruction sent by a user is received.

For example, after the terminal device displays driver installation options, the user can send a selection instruction to the terminal device by touching the terminal device, voice interaction, gesture interaction, etc., and the selection instruction indicates the driver installation option selected by the user.

At Step 2010, according to the selection instruction, a driver installation mode indicated by the driver installation option corresponding to the selection instruction is determined and performed.

For example, after receiving the selection instruction, the terminal device determines a driver installation option corresponding to the selection instruction, and then the terminal device determines and performs the driver installation mode indicated by the driver installation option.

It should be noted that the foregoing implementation methods are not limited to the foregoing descriptions. For example, the above-described Step 205 to Step 208 may be performed after Step 203 and before Step 204 or following Step 204, and such different combinations are with the protection scope of the embodiments.

Figure 4:
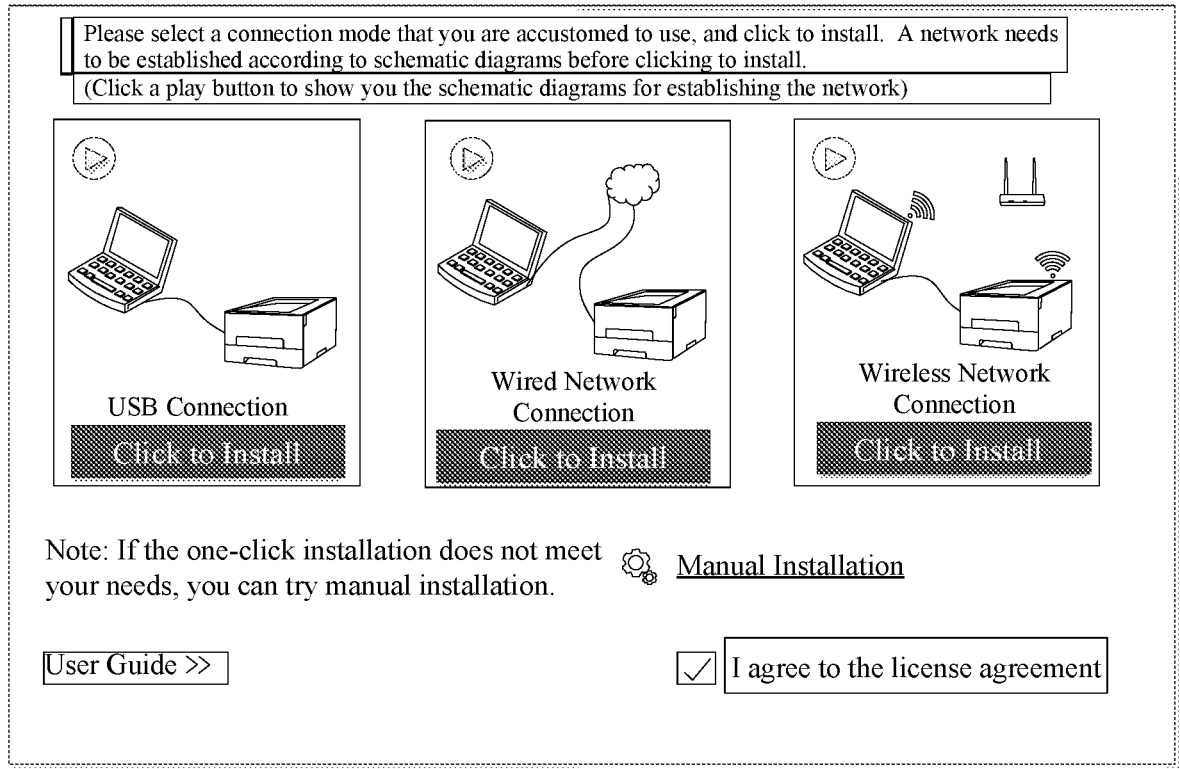
FIG. 4 is another display diagram of driver installation options according to disclosed embodiments of the present disclosure.

FIG. 4 is another display diagram of driver installation options provided by various embodiments of the present disclosure. As shown in FIG. 4, the user can select "click to install" displayed on the driver installation option, and further the terminal device performs the driver installation mode indicated by the driver installation option.

It should be noted that FIG. 2 and FIG. 4 are merely schematic diagrams of two different statuses provided by the embodiment, but the embodiment is not limited thereto. According to actual situations, driver installation options capable of successfully installing the driver can be displayed according to "click to install" corresponding to FIG. 4, and driver installation options that cannot successfully install the driver can be displayed according to "not connected" corresponding to FIG. 2.

In this embodiment, the connection information between the peripheral device corresponding to the driver and the terminal device is obtained. According to the connection information, driver installation options capable of successfully installing the driver are determined. The driver installation options capable of successfully installing the driver are displayed. Further, when a driver installation option that cannot successfully install the driver is determined, the reason that is uncapable of successfully installing the driver is displayed. Therefore, the terminal device can obtain the installation mode between the terminal device and the peripheral device supported by the terminal device, and can install the driver in an installation mode supported by the terminal device, thereby preventing a situation in which the connection between the peripheral device and the terminal device is incorrect, such that the peripheral device and the terminal device can be connected correctly to ensure that the driver is successfully installed. By displaying driver installation options capable of successfully installing the driver to the user, the user can directly know network functions supported by the peripheral device, and unnecessary disputes between the user and the provider for the peripheral device can be prevented from occurring.

Exemplary Embodiment 3

Figure 5:
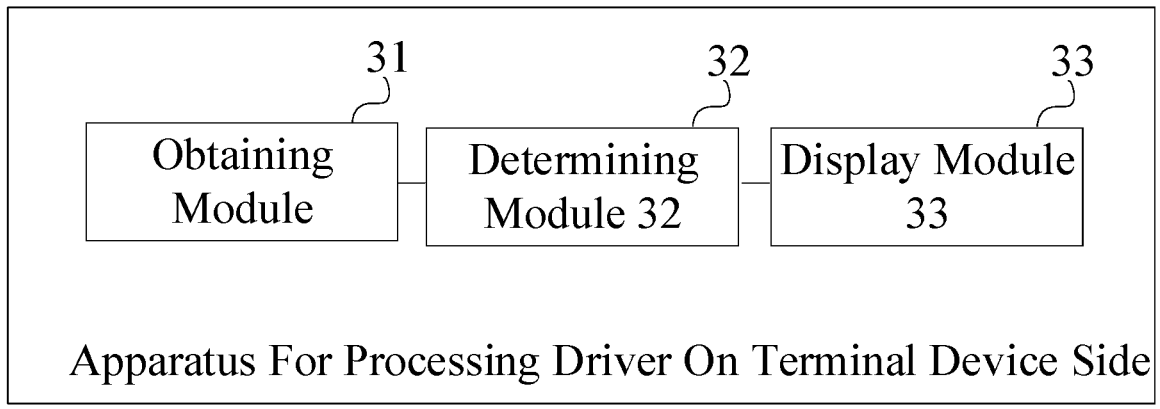
FIG. 5 is a schematic structural diagram of an apparatus for processing a driver on a terminal device side according to disclosed embodiments of the present disclosure.

Referring to FIG. 5, FIG. 5 is a schematic structural diagram of an apparatus for processing a driver on a terminal device side according to disclosed embodiments of the present disclosure. As shown in FIG. 5, the apparatus in the embodiment can include an obtaining module 31 configured to obtain connection information between the peripheral device corresponding to the driver and the terminal device; a determining module 32 configured to determine, according to the connection information, driver installation options capable of successfully installing the driver; and a display module 33 configured to display the driver installation options capable of successfully installing the driver.

The apparatus for processing the driver on the terminal device side according to the embodiment can perform a processing method for a driver on the terminal device side according to embodiments of the present disclosure, and the implementation principle thereof is similar, and details are not described herein again.

According to this embodiment, the connection information between the peripheral device corresponding to the driver and the terminal device is obtained; according to the connection information, driver installation options capable of successfully installing the driver are determined; and the driver installation options capable of successfully installing the driver are displayed. Therefore, the terminal device can obtain the installation mode between the terminal device and the peripheral device supported by the terminal device, and can install the driver in an installation mode supported by the terminal device, thereby preventing a situation in which the connection between the peripheral device and the terminal device is incorrect. Thus, the peripheral device and the terminal device can be connected correctly to ensure that the driver is successfully installed. By displaying to the user the driver installation options capable of successfully installing the driver, the user can directly know network functions supported by the peripheral device, and unnecessary disputes between the user and the provider for the peripheral device can be prevented from occurring.

Exemplary Embodiment 4

Figure 6:
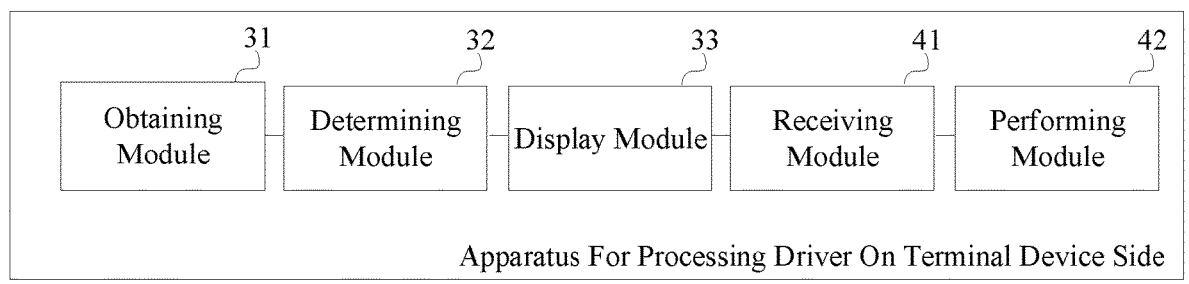
FIG. 6 is a schematic structural diagram of another apparatus for processing a driver on a terminal device side according to disclosed embodiments of the present disclosure.

Referring to FIG. 6, on the basis of the embodiment shown in FIG. 5, FIG. 6 is a schematic structural diagram of another apparatus for processing a driver on a terminal device side according to disclosed embodiments of the present disclosure. In the apparatus as shown in FIG. 6 according to the embodiments, the display module 33 is configured to display driver installation options corresponding to allowed connection modes between the terminal device and the peripheral device at a first status; and display driver installation options corresponding to connection modes that are unallowed between the terminal device and the peripheral device at a second status, where the first status characterizes that the user is allowed to select a driver installation option and the second status characterizes that the user is unallowed to select a driver installation option.

Or display module 33 is configured to only display driver installation options capable of successfully installing the driver, and not display driver installation options that cannot successfully install the driver.

Being capable of successfully installing the driver indicates that the terminal device and peripheral device include hardware required by the driver installation option in the driver that satisfies predetermined requirements, and the terminal device and the peripheral device are connected according to predetermined requirements, such that the prerequisite for the successful installation of the driver installation option is already available. Being uncapable of successfully installing the driver indicates that the terminal device and the peripheral device include hardware required by the driver installation option in the driver that does not satisfy predetermined requirements, and/or the terminal device and the peripheral device are not connected according to predetermined requirements. Therefore, the prerequisite for the successful installation of the driver installation option is not available.

The obtaining module 31 is further configured to obtain, when at least one connection path in the connection information between the peripheral device corresponding to the driver obtained by the obtaining module and the terminal device is usable, type attribute information of the peripheral device.

The determining module 32 also determines driver installation options by which the driver cannot be successfully installed based on the type attribute information of the peripheral device; and determines, based on all driver installation options supported by the driver and the driver installation options by which the driver cannot be successfully installed, and driver installation options supported by the connection information between the peripheral device corresponding to the driver and the terminal device, driver installation options capable of successfully installing the driver.

When the determining module 32 determines that a driver installation option that cannot successfully install the driver exists, the display module is also configured to display the reason why the driver cannot be successfully installed.

The apparatus provided in the embodiment further includes a receiving module 41 configured to receive a selection instruction sent by the user after the display module 33 displays driver installation options; and a performing module 42 configured to determine and perform, according to the selection instruction, a driver installation mode indicated by the driving installation option corresponding to the selection instruction. The apparatus according to the embodiment further includes a network status determining module. The network status determining module is configured to obtain, when an established network connection between the peripheral device corresponding to the driver and the terminal device is obtained, whether the network attribute information corresponding to the peripheral device satisfies a predetermined requirement, and to determine whether the network connection between the peripheral device and the terminal device belongs to a wired network connection or a wireless network connection.

The processing apparatus of the driver on the terminal device side according to the embodiment can be configured to perform another processing method for the driver on the terminal device side according to embodiments of the present disclosure. The implementation principles thereof are similar, and details are not described here again.

In this embodiment, the connection information between the peripheral device corresponding to the driver and the terminal device is obtained. According to the connection information, driver installation options capable of successfully installing the driver is determined. The driver installation options capable of successfully installing the driver are displayed. Further, when a driver installation option uncapable of successfully installing the driver is determined, the reason that is uncapable of successfully installing the driver is displayed. Therefore, the terminal device can obtain the installation mode between the terminal device and the peripheral device supported by the terminal device, and can install the driver in an installation mode supported by the terminal device, thereby preventing a situation in which the connection between the peripheral device and the terminal device is incorrect. Thus, the peripheral device and the terminal device can be connected correctly to ensure that the driver is successfully installed. By displaying driver installation options capable of successfully installing the driver to the user, the user can directly know network functions supported by the peripheral device, and unnecessary disputes between the user and the provider for the peripheral device can be prevented from occurring.

Figure 7:
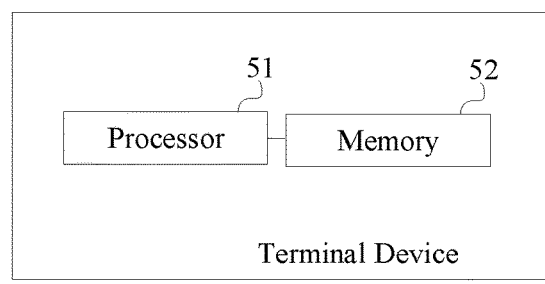
FIG. 7 is a schematic structural diagram of a terminal device according to disclosed embodiments of the present disclosure.

FIG. 7 is a schematic structural diagram of a terminal device according to disclosed embodiments of the present disclosure. As shown in FIG. 7, the device in the embodiment can include a processor 51 and a memory 52.

The processor 51 is connected to the memory 52.

The memory 52 is configured to store computer executable program code, and the program code includes instructions. When the processor 51 executes the instructions, the instructions cause the terminal device to perform methods according to embodiments shown in FIG. 1 to FIG. 4.

The embodiments of the present disclosure further provide a computer storage medium. The computer storage medium can store program instructions for instructing any one of the above-described methods, such that the processor executes the program instructions to implement methods and functions of the terminal device related to the above-described method embodiments.

The embodiments of the present disclosure further provide a peripheral device. The peripheral device is connected to a terminal device. The peripheral device communicates with the terminal device, after the terminal device completes the driver installation according to methods of embodiments shown in FIG. 1 to FIG. 4.

The technical effect of the present disclosure is as follows. The connection information between the peripheral device corresponding to the driver and the terminal device is obtained. According to the connection information, driver installation options capable of successfully installing the driver are determined. The driver installation options capable of successfully installing the driver are displayed. Therefore, the terminal device can obtain the installation mode between the terminal device and the peripheral device supported by the terminal device, and can install the driver in an installation mode supported by the terminal device, thereby preventing a situation in which the connection between the peripheral device and the terminal device is incorrect, such that the peripheral device and the terminal device can be connected correctly to ensure that the driver is successfully installed. By displaying driver installation options capable of successfully installing the driver to the user, the user can directly know network functions supported by the peripheral device, and unnecessary disputes between the user and the provider for the peripheral device can be avoided.

A person skilled in the art is to clearly understand that for the convenience and concision of the description, for the specific operation process of the above-described systems, apparatuses, and units described above, references can be made to the corresponding process in the foregoing method embodiments, and details are not described here again.

In the embodiments provided in the present application, it should be understood that the disclosed system, apparatus, and method may be implemented in other modes. For example, the described apparatus embodiments are merely exemplary. For example, the units are merely divided according to logical functions and can be divided in other manners in actual implementation. For example, multiple units or components can be combined or integrated into another system, or some features can be ignored or not performed. In addition, the displayed or discussed mutual couplings or direct couplings or communication connections may include an indirect connection or communication connection through some interfaces, devices, or units, which may be electrical, mechanical, or in other form.

The units described as separate parts may or may not be physically separated, and parts displayed as units may or may not be physical units. That is, the units may be located in one place or may be distributed over a plurality of network elements. Some or all of the units may be selected according to the actual needs to achieve the objectives of the solutions of the embodiments.

In addition, functional units in the embodiments of the present disclosure may be integrated into one processing unit or exist as separate physical units, or two or more units are integrated into one unit. The integrated unit may be implemented through hardware, or may also be implemented in a form of hardware plus a software functional unit.

The integrated unit implemented in the form of the software functional unit may be stored in a computer readable storage medium. The software functional unit is stored in a storage medium, and contains several instructions used to instruct computer equipment (for example, a personal computer, a server, or network equipment) or a processor to perform a part of the steps of the methods according to the embodiments of the present disclosure. The storage medium may include any medium that can store program code, such as a universal serial bus (USB) flash drive, a removable hard disk, a read-only memory (ROM), a random access memory (RAM), a magnetic disk, or an optical disk.

It should be noted that the foregoing embodiments of the present disclosure are merely exemplary embodiments and are not intended to limit the present application. Any modifications, equivalent substitutions, improvements, etc. made within the spirit and principles of present invention are within the protection scope of present invention.

What is claimed is:

1. A method for presenting driver installation options on a terminal device side, comprising:
    establishing a connection between a peripheral device and a terminal device;
    clicking a driver installation package in the terminal device connected to the peripheral device, wherein the driver installation package comprises drivers and the driver installation package corresponds to multiple models of peripheral devices developed by a same manufacturer;
    after clicking the driver installation package in the terminal device, performing the steps of:
        displaying the driver installation interface;
        obtaining connection information of a connection between the peripheral device and the terminal device, wherein the obtaining of connection information includes analyzing ports of the terminal device;
        determining, according to the connection information, connection modes between the terminal device and the peripheral device, and the driver installation options corresponding to the established connection modes capable of successfully installing the driver, wherein the connection modes capable of successfully installing the driver are displayed in a first selectable format while the connection modes that are unallowed are displayed in a second non-selectable format, and the driver installation options are displayed before the driver installation;

after determining connection modes between the terminal device and the peripheral device based on the port analysis and driver installation options corresponding to the connection modes capable of successfully installing the driver, displaying the driver installation options corresponding to the connection modes capable of successfully installing the driver, wherein displaying the driver installation options corresponding to the connection modes capable of successfully installing the driver includes displaying driver installation options corresponding to allowed connection modes between the terminal device and the peripheral device in the first selectable format and displaying driver installation options corresponding to connection modes that are unallowed between the terminal device and the peripheral device in the second non-selectable format; and clicking one connection mode capable of successfully installing the driver to cause the terminal to use the one connection mode to install the driver for the peripheral device based on the driver installation options.

2. The method according to claim 1, wherein:
the connection modes between the terminal device and the peripheral device include a USB connection mode, a wired network connection mode, and a wireless network connection mode.

3. The method according to claim 1, wherein displaying the driver installation options corresponding to the connection modes includes:
displaying only the driver installation options corresponding to the connection modes capable of successfully installing the driver, and not displaying driver installation options corresponding to the connection modes uncapable of successfully installing the driver, wherein:
being capable of successfully installing the driver indicates that the terminal device and peripheral device include hardware required by a driver installation option in the driver that satisfies a predetermined requirement, and the terminal device and the peripheral device are connected according to the predetermined requirement, wherein a prerequisite for a successful installation of the driver installation option is available, and
being uncapable of successfully installing the driver indicates that the terminal device and the peripheral device include hardware required by the driver installation option in the driver that does not satisfy the predetermined requirement, and/or the terminal device and the peripheral device are not connected according to the predetermined requirement, wherein the prerequisite for the successful installation of the driver installation option is unavailable.

4. The method according to claim 1, further comprising, after obtaining the connection information between the peripheral device corresponding to the driver and the terminal device:
when at least one connection path in the connection information between the peripheral device corresponding to the driver and the terminal device is usable, further obtaining type attribute information of the peripheral device; and
determining driver installation options corresponding to the connection modes uncapable of successfully installing the driver according to the type attribute information of the peripheral device, and determining driver installation options corresponding to the connection modes capable of successfully installing the driver, based on all driver installation options supported by the driver, the driver installation options corresponding to the connection modes uncapable of successfully installing the driver, and driver installation options corresponding to the connection modes supported by the connection information between the peripheral device corresponding to the driver and the terminal device.

5. The method according to claim 1, further comprising, after displaying the driver installation options corresponding to the connection modes:
receiving a selection instruction sent by a user; and
determining and performing, according to the selection instruction, a driver installation mode indicated by a driver installation option corresponding to the selection instruction.

6. The method according to claim 1, wherein obtaining the connection information between the peripheral device corresponding to the driver and the terminal device includes:
when an established network connection between the peripheral device corresponding to the driver and the terminal device is obtained, obtaining whether network attribute information corresponding to the peripheral device satisfies a predetermined requirement, and determining whether the network connection between the peripheral device and the terminal device belongs to a wired network connection or a wireless network connection.

7. The method according to claim 1, further comprising:
determining a driver installation option is uncapable of successfully installing the driver; and
displaying a reason, the reason indicating that the driver installation option is uncapable of successfully installing the driver.

8. A terminal device, comprising:
a memory, configured to store program instructions for performing a method for presenting driver installation options; and
a processor, coupled to the memory, and when the program instructions being executed, configured to:
establish a connection between a peripheral device and a terminal device;
click a driver installation package in the terminal device connected to the peripheral device, wherein the driver installation package comprises drivers and the driver installation package corresponds to multiple models of peripheral devices developed by a same manufacturer;
after clicking the driver installation package in the terminal device, perform the steps of:
display the driver installation interface;
obtain connection information of a connection between the peripheral device and the terminal device, wherein the obtaining of connection information includes analyzing ports of the terminal device;
determine, according to the connection information, connection modes between the terminal device and the peripheral device, and driver installation options corresponding to the established connection modes capable of successfully installing the driver, wherein the connection modes capable of successfully installing the driver are displayed in a first selectable format while the connection modes that are unallowed are displayed in a second non-selectable format, and the driver installation options are displayed before the driver installation;

after determining connection modes between the terminal device and the peripheral device based on the port analysis, and driver installation options corresponding to the connection modes capable of successfully installing the driver, display the driver installation options corresponding to the connection modes capable of successfully installing the driver, wherein displaying the driver installation options corresponding to the connection modes capable of successfully installing the driver includes displaying driver installation options corresponding to allowed connection modes between the terminal device and the peripheral device in the first selectable format and displaying driver installation options corresponding to connection modes that are unallowed between the terminal device and the peripheral device in the second non-selectable format; and click one connection mode capable of successfully installing the driver to cause the terminal to use the one connection mode to connect the peripheral device based on the driver installation options.

9. The device according to claim 8, wherein the processor is further configured to:

display only the driver installation options corresponding to the connection modes capable of successfully installing the driver, and not display driver installation options corresponding to the connection modes uncapable of successfully installing the driver, wherein:

being capable of successfully installing the driver indicates that the terminal device and peripheral device include hardware required by a driver installation option in the driver that satisfies a predetermined requirement, and the terminal device and the peripheral device are connected according to the predetermined requirement, wherein a prerequisite for a successful installation of the driver installation option is available, and being uncapable of successfully installing the driver indicates that the terminal device and the peripheral device include hardware required by the driver installation option in the driver that does not satisfy the predetermined requirement, and/or the terminal device and the peripheral device are not connected according to the predetermined requirement, wherein the prerequisite for the successful installation of the driver installation option is unavailable.

10. The device according to claim 8, wherein the processor is further configured to:

obtain type attribute information of the peripheral device, when at least one connection path in the connection information between the peripheral device corresponding to the driver and the terminal device is usable, and determine driver installation options corresponding to the connection modes uncapable of successfully installing the driver according to the type attribute information of the peripheral device, and determine driver installation options corresponding to the connection modes capable of successfully installing the driver, based on all driver installation options corresponding to the connection modes supported by the driver, the driver installation options corresponding to the connection modes uncapable of successfully installing the driver, and driver installation options corresponding to the connection modes supported by the connection information between the peripheral device corresponding to the driver and the terminal device.

11. The device according to claim 8, wherein the processor is further configured to:

receive a selection instruction sent by a user after the driver installation options corresponding to the connection modes are displayed, and determine and perform, according to the selection instruction, a driver installation mode indicated by a driver installation option corresponding to the selection instruction.

12. The device according to claim 8, wherein the processor is further configured to:

obtain whether network attribute information corresponding to the peripheral device satisfies a predetermined requirement, when an established network connection between the peripheral device corresponding to the driver and the terminal device is obtained; and determine whether the network connection between the peripheral device and the terminal device belongs to a wired network connection or a wireless network connection.

13. The device according to claim 8, wherein:

after the terminal device completes an installation of the driver, the terminal device communicates with the peripheral device.

14. The device according to claim 8, wherein the processor is further configured to:

determining a driver installation option is uncapable of successfully installing the driver; and display a reason, the reason indicating that the driver installation option is uncapable of successfully installing the driver.

15. A non-transitory computer-readable storage medium, containing program instructions for, when executed by a processor, performing a method for presenting driver installation options on a terminal device side, the method comprising:

establishing a connection between a peripheral device and a terminal device;

clicking a driver installation package in the terminal device connected to the peripheral device, wherein the driver installation package comprises drivers and the driver installation package corresponds to multiple models of peripheral devices developed by a same manufacturer;

after clicking the driver installation package in the terminal device, performing the steps of:

displaying the driver installation interface;

obtaining connection information of a connection between the peripheral device and the terminal device, wherein the obtaining of connection information includes analyzing ports of the terminal device;

determining, according to the connection information, connection modes between the terminal device and the peripheral device, and driver installation options corresponding to the established connection modes capable of successfully installing the driver, wherein the connection modes capable of successfully installing the driver are displayed in a first selectable format while the connection modes that are unallowed are displayed in a second non-selectable format, and the driver installation options are displayed before the driver installation;

after determining connection modes between the terminal device and the peripheral device based on the port analysis, and driver installation options corresponding to the connection modes capable of successfully installing the driver, displaying the driver installation options corresponding to the connection modes capable of successfully installing the driver, wherein displaying the driver installation options corresponding to the connection modes capable of successfully installing the driver includes displaying driver installation options corresponding to allowed connection modes between the terminal device and the peripheral device in the first selectable format and displaying driver installation options corresponding to connection modes that are unallowed between the terminal device and the peripheral device in the second non-selectable format; and clicking one connection mode capable of successfully installing the driver to cause the terminal to use the one connection mode to connect the peripheral device based on the driver installation options.

16. The storage medium according to claim 15, wherein displaying the driver installation options corresponding to the connection modes includes:

displaying only the driver installation options corresponding to the connection modes capable of successfully installing the driver, and not displaying driver installation options corresponding to the connection modes uncapable of successfully installing the driver, wherein:

being capable of successfully installing the driver indicates that the terminal device and peripheral device include hardware required by a driver installation option in the driver that satisfies a predetermined requirement, and the terminal device and the peripheral device are connected according to the predetermined requirement, wherein a prerequisite for a successful installation of the driver installation option is available, and being uncapable of successfully installing the driver indicates that the terminal device and the peripheral device include hardware required by the driver installation option in the driver that does not satisfy the predetermined requirement, and/or the terminal device and the peripheral device are not connected according to the predetermined requirement, wherein the prerequisite for the successful installation of the driver installation option is unavailable.

17. The storage medium according to claim 15, wherein the method further includes, after obtaining the connection information between the peripheral device corresponding to the driver and the terminal device:

when at least one connection path in the connection information between the peripheral device corresponding to the driver and the terminal device is usable, further obtaining type attribute information of the peripheral device; and determining driver installation options corresponding to the connection modes uncapable of successfully installing the driver according to the type attribute information of the peripheral device, and determining driver installation options corresponding to the connection modes capable of successfully installing the driver, based on all driver installation options corresponding to the connection modes supported by the driver, the driver installation options corresponding to the connection modes uncapable of successfully installing the driver, and driver installation options corresponding to the connection modes supported by the connection information between the peripheral device corresponding to the driver and the terminal device.

18. The storage medium according to claim 15, wherein the method further comprises:

determining a driver installation option is uncapable of successfully installing the driver; and display a reason, the reason indicating that the driver installation option is uncapable of successfully installing the driver.

* * * * *